(12) United States Patent
Polovinkin

(10) Patent No.: US 8,573,528 B2
(45) Date of Patent: Nov. 5, 2013

(54) VERTICAL TAKE-OFF AND VERTICAL LANDING GYROPLANE

(76) Inventor: Boris Andreevich Polovinkin, Krasnoobsk (RU)

( * ) Notice: Subject to any disclaimer, the term of this patent is extended or adjusted under 35 U.S.C. 154(b) by 358 days.

(21) Appl. No.: 12/988,808

(22) PCT Filed: Apr. 21, 2008

(86) PCT No.: PCT/RU2008/000240
§ 371 (c)(1),
(2), (4) Date: Aug. 17, 2011

(87) PCT Pub. No.: WO2009/131479
PCT Pub. Date: Oct. 29, 2009

(65) Prior Publication Data
US 2012/0248240 A1    Oct. 4, 2012

(51) Int. Cl.
*B64C 27/00* (2006.01)
(52) U.S. Cl.
USPC ............... 244/17.11; 244/17.19; 244/17.21
(58) Field of Classification Search
USPC .......... 244/17.11, 17.19, 17.21, 17.25, 17.27, 244/8
See application file for complete search history.

(56) References Cited

U.S. PATENT DOCUMENTS 3,558,082 A * 1/1971 Bennie ..................... 244/17.25
4,653,705 A * 3/1987 Bensen ..................... 244/17.11
5,544,844 A * 8/1996 Groen et al. .................... 244/8
6,659,395 B2 * 12/2003 Rehkemper et al. ....... 244/17.11
6,824,093 B1 * 11/2004 Haseloh et al. .................. 244/8
8,357,023 B2 * 1/2013 Van De Rostyne et al. .... 446/36
2012/0181378 A1 * 7/2012 Birkner ..................... 244/17.11

FOREIGN PATENT DOCUMENTS

WO      WO 9400343 A1 * 1/1994

* cited by examiner

*Primary Examiner* — Christopher P Ellis
(74) *Attorney, Agent, or Firm* — Bardmesser Law Group

(57) ABSTRACT

A gyroplane comprises a fuselage 1 with a cockpit, with a folding strut mounted on it, a rotor head 3, with adjustable torsional hub 16 and pusher propeller 5 with adjustable pitch. In order to uniformly distribute the load applied on the torsional hub 16, on the rotor head 3 while prespinning of the rotor blades 4, the torsional bar is performed from substantially straight composite plates. In order to reduce vibration on the control stick in-flight, the surface of fastening the rocking joint 15 of the torsional hub 16, is turned at the angle not more than 40 degrees to the longitudinal axis of the torsional hub 16 of the rotor blades 4. In order to reduce the load applied on the gyroplane control stick in-flight, the rotor head 3 is fastened to the strut through a frame joint 9 with trunnion offset forwardly in pitch. In order to set the thrust rating in-flight, the pusher propeller 5 is provided with an adjustable torsional hub 16 performed of composite plates. The propeller 5 with adjustable pitch can be applied in both pushing and pulling variants and can be used in any aircraft plane.

14 Claims, 4 Drawing Sheets

VERTICAL TAKE-OFF AND VERTICAL LANDING GYROPLANE

CROSS-REFERENCE TO RELATED APPLICATIONS

The present application is a U.S. national stage of the PCT/RU2008/000240, filed on Apr. 21, 2008, which is incorporated herein by reference in its entirety.

TECHNICAL FIELD

The field of the invention is aeromechanics, specifically manufacturing and operating of gyroplanes.

May kinds of gyroplanes are known and which have been built recently. There is known the gyroplane described in applications WO 1997/008050 and WO 1998/030446. The principle of pitch variation of rotor and pusher screw is in manufacturing of special hollow-centered blades inside which there are long torsional bars. The gyroplane described in these applications allows performing vertical take-off and vertical landing due to pitch variation of rotor. Blades of the pusher screw with variable pitch are manufactured according the same principle as the blades of the rotor.

The disadvantageous feature of such a gyrolane is in a special labor-intensive technique of manufacturing of blades and torsional bars, which does not permit using the standard techniques for manufacturing of blades used in aviation.

There is also a gyroplane described in RU 2 313 473 C1 (2007), in which a head of rotor with variable pitch and a torsional hub are described. A disadvantageous feature of this construction is the fact that the rocking joint has side planes that are milled off at an angle 2-3 degrees to the flat surface, with the result that the fiberglass torsion fixed on the rocking joint has an angle of 4-6 degrees. During the initial rotation of the rotor, and owing to centrifugal forces, the angle is reduced up to 0, and by doing so the upper fiberglass planes of the torsion experience additional rupture load, and the lower planes are constricted, which is an disadvantageous feature of the construction and can lead to damage of the torsional bars during rotation of the rotor.

In order to reduce the load applied to the control stick during the gyroplane in-flight control, the frame joint is designed symmetrically, and on the rotor head there is an aerodynamic shroud functioning as an offloading air compensator. This construction cannot effectively solve the problem of reducing the load applied to the control stick during the gyroplane in-flight control.

Consequently, there is a need to develop a gyroplane with improved components, which would be reliable in-flight, responsive and can be conveniently stored.

DETAILED DESCRIPTION OF THE PREFERRED EMBODIMENTS

The basic concept of the proposed invention is the development of a gyroplane with controllable rotor pitch for performing of vertical take-off and vertical landing, with an adjustable pitch pusher, and a folding pylon for convenience of storage and transportation.

The objective is achieved by development of a gyroplane comprising a fuselage with a cockpit, with a folding pylon installed on it. A rotor head is provided with an adjustable torsional hub. A power unit with adjustable pitch pusher propeller is placed behind the cockpit. A vertical fin includes a control blade. The gyroplane also includes a tricycle landing gear.

In order to uniformly distribute the load through the torsional hub during initial rotation of the rotor, a torsional bar in the rotor head is made of flat composite plates without bending.

In order to reduce a control stick vibration during the flight, the flat surface for fastening the rocking joint of the torsional hub is turned on an angle of not more than 40° to the longitudinal axis of the torsional hub of the rotor.

Preferably, the flat surface of fastening the rocking joint of the torsional hub is turned at an angle of 30° to the longitudinal axis of the torsional bar.

According to another embodiment, the flat surface of fastening the rocking joint of the torsional rotor hub coincides with the longitudinal axis of the torsional bar.

In order to reduce the load on the control stick in flight in pitch, the rotor head is fastened to the strut through the frame joint with the pitch trunnion offset forward.

For convenience during storage and transportation of the gyroplane, rotor blades are removed, the strut is folded in the horizontal direction by using an electric motor drive without additional disassembly. For that, all clutch control rod joints of the rotor head, as well as the Hooks joint of rotor spin up drive shafts, are placed on the pivot axis of the strut frame.

The described rotor head can be used in other gyroplane configurations.

In order to set a favorable engine thrust rating during flight, the pusher propeller is provided with an adjustable pitch. For this purpose, on the hollow gear case flange crossed by the pitch actuation rod, a hollow axle-journal is installed, which is provided with a torsional hub of composite planes. The entire mechanism with adjustable pitch is covered with a large diameter spinner. Trapezoidal blades defining the spinner are fastened at the ends of the torsional hub. The construction of the air propeller with adjustable pitch can be applied both in pushing and pulling variants and can be used in any aircraft.

The engineering result of the set forth solution is development of a gyroplane which is a safe, reliable and compact aircraft plane with vertical take-off and vertical landing.

The following is one embodiment of a gyroplane with vertical take-off and vertical landing.

BRIEF DESCRIPTION OF THE ATTACHED FIGURES

Figure 1:
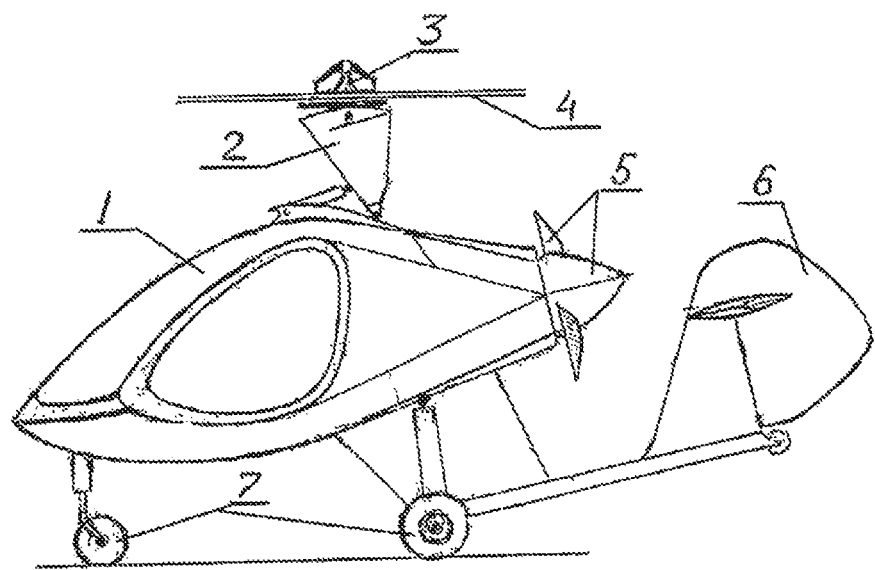
FIG. 1 shows a gyroplane main view.

The gyroplane includes a fuselage 1 (see FIG. 1), strut frames 2, rotor heads 3, rotors 4, a pusher propeller 5, a vertical fin 6, and tricycle landing gear 7.

Figure 2:
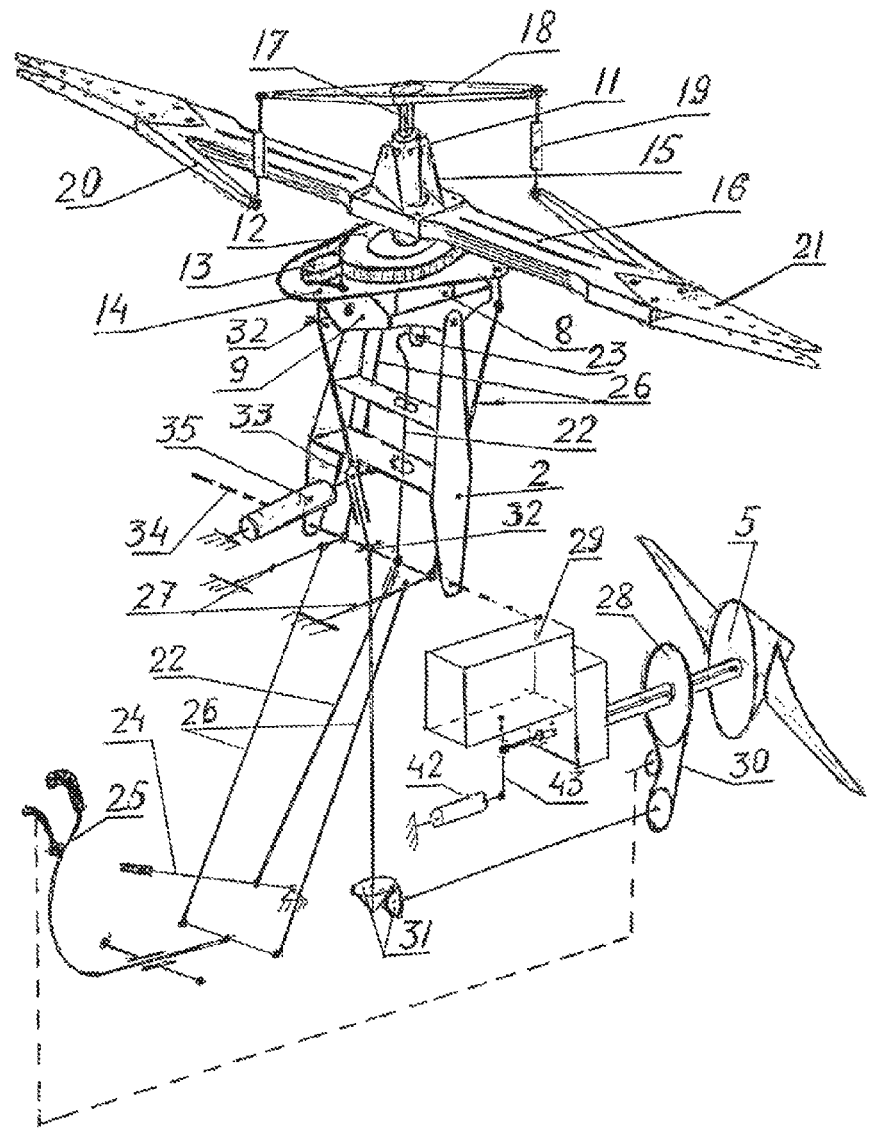
FIG. 2 shows gyroplane control mechanisms configuration.

The rotor head 3 (FIG. 2) includes a hub bearing body 8 fastened to a strut frame 2, through a frame joint 9, provided with a forward-offset pitch trunnion 10. (see FIG. 3).

A hollow hub-shaft 11 is set into the body bearing 8. On the axle-journal 11, a screw wheel 12 is installed positively or through a free wheel unit, depending on the drive component configuration.

The drive 13 of the rotor spin up 4 is set on a plate 14. The hub bearing body 8 is fastened on the plate 14. On the hub-shaft 11 a rocking joint 15 is installed, which is provided with a torsion bar composed of straight composite planes.

Figure 3:
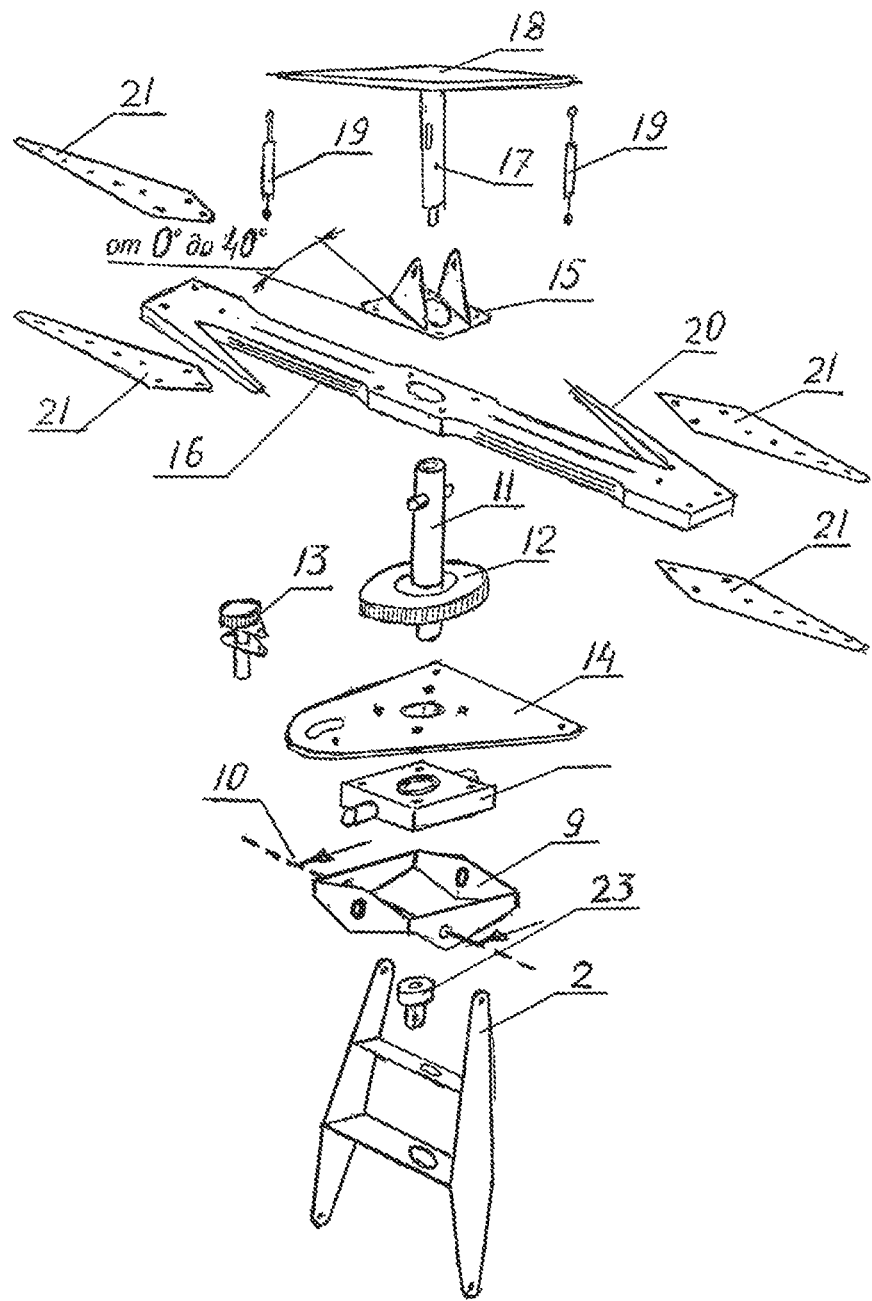
FIG. 3 shows detailing of the rotor head with adjustable pitch.

The flat surface of fastening the rocking joint 15 of the torsional hub 16 of the rotor blades 4 is turned on an angle of not more than 40 degrees to the longitudinal axis of the torsional bar. Alternatively, the flat surface of fastening the rocking joint 15 of the torsional hub 16 of the rotor blades 4 coincides the longitudinal axis of the torsional bar (FIG. 3).

The hollow axle-journal 11 comprises a drive shaft 17, which is provided with a tappet lever 18. The rocking joint 15 and the tappet lever shaft 17 are fixed on the axle-journal 11 by an axis member. The ends of the tappet lever 18 through rods 19 are joined with levers 20 of the torsional hub 16.

The rotor blades are fastened to the torsional hub 16 through plates 21. The tappet lever shaft 18 is coupled to the pitch rod 22 through a bearing joint 23.

Rotor blades pitch control:

From the control stick 24 through rods 22, through a bearing joint 23, sliding cylinder 17, force is transmitted to the tappet lever 18 and through the rods 19, which has an effect on the torsional hub 16, a set of straight composite plates, thereby changing rotor blades' pitch.

From the gyroplane control stick 25 through the rods 26, fastened on rocking levers 27, force is transmitted on the plate 14 with a hub bearing body 8, a hub-shaft 11, a rocking joint 15 with a torsional hub 16. As such, the rotor blades 4 angle is changed in pitch and in roll.

Initial rotation of the rotor blades 4:

From the split wheel 28, settled on the motor reducer drive shaft 29, through a belt-drive 30 with a tension pulley the torque effect is transferred to the angle gear 31.

From the angle gear 31 through a double Hooke's joint 32 and a spline joint 33, the torque effect is transferred to the drive connection 13 of the rotor blades 4 during initial rotation.

Folding of the strut frame 2 into a horizontal orientation:

All linkage connections 26 of the rotor head control 3 and the flexible Hooke's joint 32 of power shafts of the rotor blades 4 initial rotation, are placed on the axis of rotation 34 of the strut frame 2. This allows, when rotor blades 4 blades are removed, by use of an electric hydraulic drive 35, to turn the strut in the horizontal without any additional disassembling.

Figure 4:
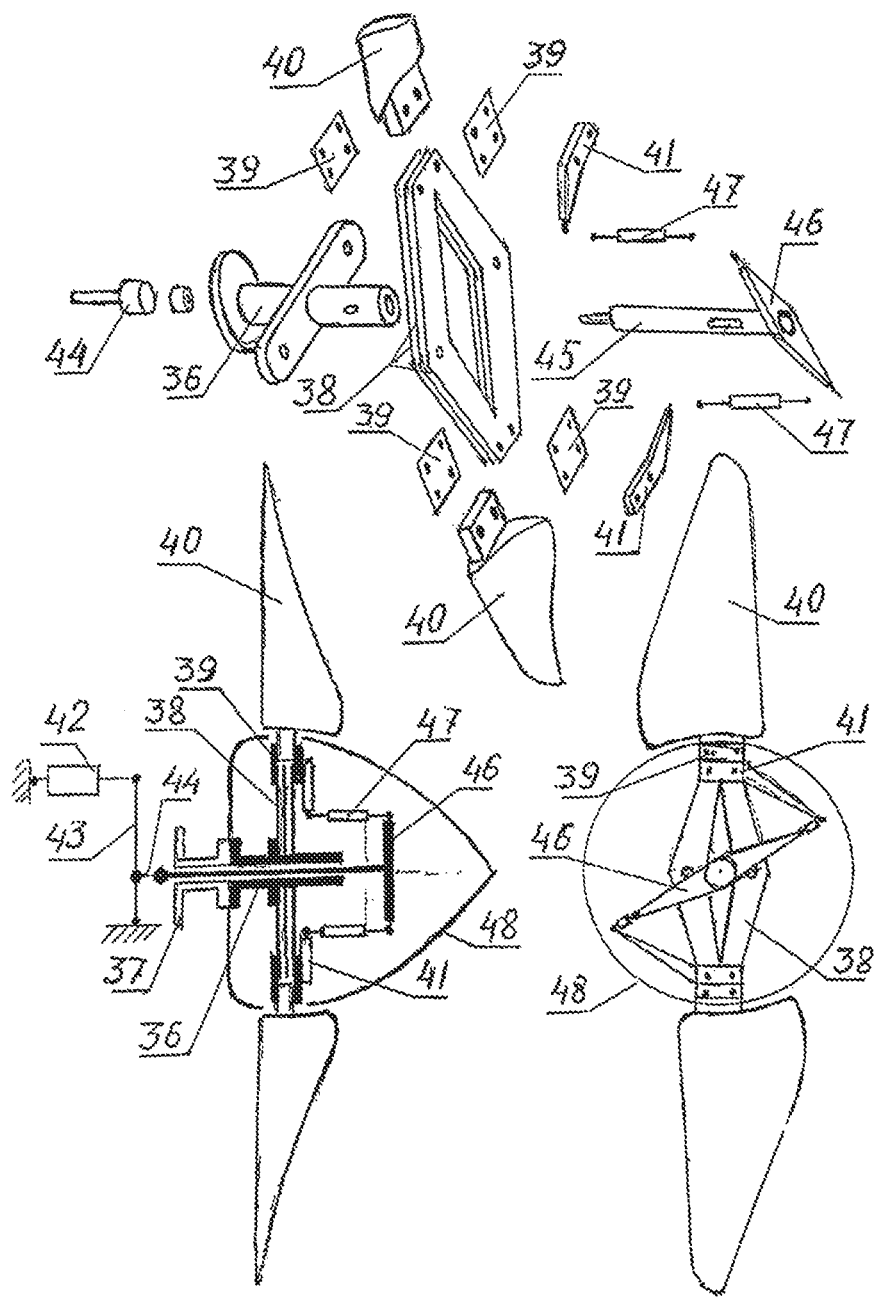
FIG. 4 shows detailing of the pusher propeller with adjustable pitch.

The pusher propeller with adjustable pitch 5:

The pusher propeller with adjustable pitch 5 consists of a hollow axle-journal 36, crossed by a studded tappet lever drive shaft 45 (FIG. 4).

A torsional hub 38, formed of straight composite plates is installed on the axle-journal 36.

On the ends of the torsional hub 38 through the fitting 39, blades 40 and pitch control levers 41 are fastened. The entire mechanism is covered by a spinner 48 of a large diameter.

The force from the electrical drive 42, through the lever 43, through the bearing joint 44, is transferred to the drive shaft 45 and tappet lever 46. from the tappet lever 46, through the rods 47, the force is transmitted to the levers 41, and to the torsional hub 38 of the pusher propeller 5. In this way, the pitch of the blades 40 of the pusher propeller 5 is changed.

The gyroplane functions in the following manner:

The engine 29 is run. By using the common control stick 24, the rotor blades 4 are fed out at zero angle of attack. After that, by using the belt-drive 30 with a tension roller the rotor blades 4 is spun up to the speed a factor of 1.5× more than during flight, at the same time the gyroplane brake is held. The rotor blades 4 common pitch control system provides three fixed positions on the collective control stick at the angle of the rotor blades installation: with zero angle of attack, rigging (in flight) and landing.

After the rotor blades 4 has reached the speed of 450-500 rpm, the rotor blades 4 rotation stops. By using the common control stick 24, the angle of attack of the rotor blades 4 is switched to the rigging point (in-flight angle of orientation) and the motor speed is increased. It results in a loading of the rotor blades 4.

The gyroplane performs the vertical take-off and starts to move forward, at the same time the rotation speed of the rotor blades 4 drop to in-flight, and the rotor blades 4 spins due to airflow. From now on the gyroplane is flies like a plane. Before landing of the gyroplane throttle is cut and hovering over the landing ground the gyroplane starts to lower itself to the ground. At the approach height of 1-2 meters from ground depending on the rotor blades 4 weight, by use of the common control stick 24, the angle of attack of the rotor blades increases, which means it is turned to the landing angle. At the same time the horizontal speed of the gyroplane significantly reduces and a soft landing is performed.

The gyroplane is equipped with the pusher propeller 5 with adjustable pitch. While performing a pre-programmed flight or flight at high speed, by using an electrical drive 42, the angle of attack of the blades 40 of the pusher propeller 5 fastened on the ends of the torsional hub 38 is increased. By doing so, a favorable thrust rating is provided.

For convenience in storage of the gyroplane and of its transportation by a trailer truck, it is enough to remove the rotor blades 4 and by using an electric and hydraulic drive 35 to lower the strut in to the horizontal without any additional disassembling.

PREFERRED EMBODIMENT OF THE INVENTION

The above-described gyroplane is the best variant of the invention embodiment and is shown in FIGS. 1-4.

According to this embodiment, the gyroplane comprises a fuselage equipped with a folding strut mounted on the fuselage, with a rotor head with an adjustable torsional hub, and a pusher propeller with adjustable pitch.

In order to uniformly distribute load on the torsional hub 16 of the rotor blades 4, while initially rotating the rotor blades 4, the torsional element is made of flat (substantially straight) composite plates that are not intended to bend.

In order to reduce vibration on the control stick in-flight, the surface of fastening the rocking joint 15 of the torsional hub 16 of the rotor blades 4, is turned at an angle of 30 degrees to the longitudinal axis of the torsional hub (FIG. 3).

In order to reduce the load applied to the gyroplane control stick during flight, the axle 10 of the frame joint 9 is forward-offset.

In order to provide convenience in storage and transportation by a trailer truck, the strut can be made in a folding design.

In order to choose the thrust rating in-flight, the pusher propeller 5 (FIG. 4) is provided with adjustable pitch.

INDUSTRIAL APPLICABILITY

The invention is applied in manufacturing of rotary-winged aircrafts, especially gyroplanes with vertical take-off and vertical landing.

The rotor head can be used in other configurations of gyroplanes. The pusher propeller with adjustable pitch can be applied in both pushing and pulling variants for any aircraft planes.

The invention claimed is:

1. A vertical take-off and landing gyroplane, comprising:
   a fuselage coupled to a strut frame located above the fuselage, the strut frame having a rotor head mounted on the strut frame through a frame joint and having a forward-offset pitch trunnion;
   the rotor head further including a torsional hub formed of substantially straight composite plates;
   a rocking joint above the torsional hub and mounted on a hollow hub-shaft,
   wherein the rocking joint is oriented at an angle of not more than 40° to a longitudinal axis of the torsional hub;
   the torsional hub having a plurality of plates with a rotor blade coupled to each plate;
   an engine within the fuselage having a pusher propeller coupled to the engine, the pusher propeller having an adjustable pitch;
   at least one vertical tail fin with a rudder, the tail fin mated to the fuselage; and
   a tricycle landing gear below the fuselage.

2. The gyroplane of claim 1, wherein a plane of mounting of the rocking joint is oriented at approximately 30° relative to the longitudinal axis.

3. The gyroplane of claim 1, wherein the pusher propeller comprises a rear torsional hub formed of composite plates, the rear torsional hub being mounted on a hollow axle-journal, and
   the rear torsional hub having a plurality of pusher propeller blades attached thereto.

4. The gyroplane of claim 1, wherein the rotor head includes a plurality of linkage connections and a flexible Hooke's joint, and
   wherein to fold the strut frame into a horizontal orientation, the plurality of linkage connections of the rotor head and the flexible Hooke's joint are placed on the axis of rotation of the strut frame.

5. The gyroplane of claim 4, wherein the linkage connections and the flexible Hooke's joint are located on the axis of rotation of the strut frame.

6. A vertical take-off and landing gyroplane, comprising:
   a fuselage coupled to a strut frame located above the fuselage, the strut frame having a rotor head mounted on the strut frame through a frame joint and having a forward-offset pitch trunnion;
   the rotor head further including a torsional hub formed of substantially straight composite plates;
   a rocking joint above the torsional hub and mounted on a hollow hub-shaft,
   wherein the rocking joint is aligned with a longitudinal axis of the torsional hub;
   the torsional hub having a plurality of plates with a rotor blade coupled to each plate;
   an engine within the fuselage having a pusher propeller coupled to the engine, the pusher propeller having an adjustable pitch;
   at least one vertical tail fin with a rudder, the tail fin mated to the fuselage; and
   a tricycle landing gear below the fuselage.

7. The gyroplane of claim 6, wherein a plane of mounting of the rocking joint is oriented at approximately 30° relative to the longitudinal axis.

8. The gyroplane of claim 6, wherein the pusher propeller comprises a rear torsional hub formed of composite plates, the rear torsional hub being mounted on a hollow axle-journal, and
   the rear torsional hub having a plurality of pusher propeller blades attached thereto.

9. The gyroplane of claim 6, wherein the rotor head includes a plurality of linkage connections and a flexible Hooke's joint, and
   wherein to fold the strut frame into a horizontal orientation, the plurality of linkage connections of the rotor head and the flexible Hooke's joint are placed on the axis of rotation of the strut frame.

10. The gyroplane of claim 9, wherein the linkage connections and the flexible Hooke's joint are located on the axis of rotation of the strut frame.

11. A rotor head assembly, comprising:
    a strut frame having a rotor head mounted thereon through a frame joint and having a forward-offset pitch trunnion;
    a torsional hub formed of substantially straight composite plates;
    a rocking joint above the torsional hub and mounted on a hollow hub-shaft,
    wherein the rocking joint is oriented at an angle of not more than 40° to a longitudinal axis of the torsional hub;
    the torsional hub having a plurality of plates with a rotor blade coupled to each plate.

12. The rotor head assembly of claim 11, wherein a plane of mounting of the rocking joint is oriented at approximately 30° relative to the longitudinal axis.

13. A rotor head assembly, comprising:
    a strut frame having a rotor head mounted thereon through a frame joint and having a forward-offset pitch trunnion;
    a torsional hub formed of substantially straight composite plates;
    a rocking joint above the torsional hub and mounted on a hollow hub-shaft,
    wherein the rocking joint is aligned with a longitudinal axis of the torsional hub;
    the torsional hub having a plurality of plates with a rotor blade coupled to each plate.

14. The rotor head assembly of claim 11, wherein a plane of mounting of the rocking joint is oriented at approximately 30° relative to the longitudinal axis.

* * * * *